(12) United States Patent
Typrin et al.

(10) Patent No.: US 8,458,095 B2
(45) Date of Patent: Jun. 4, 2013

(54) LOCATION-BASED RULES FOR A FINANCIAL ACCOUNT

(75) Inventors: Jason Typrin, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/223,445

(22) Filed: Sep. 1, 2011

(65) Prior Publication Data
US 2013/0060691 A1    Mar. 7, 2013

(51) Int. Cl.
*G06Q 40/00*    (2012.01)
(52) U.S. Cl.
USPC ............. 705/44; 705/35; 705/39; 705/38
(58) Field of Classification Search
USPC ................................. 705/44, 35, 38
See application file for complete search history.

(56) References Cited

U.S. PATENT DOCUMENTS

| | | | | |
|---|---|---|---|---|
| 5,914,472 A | * | 6/1999 | Foladare et al. | 235/380 |
| 8,321,315 B2 | * | 11/2012 | Abel et al. | 705/35 |
| 2001/0047310 A1 | * | 11/2001 | Russell | 705/26 |
| 2008/0228637 A1 | | 9/2008 | Scipioni et al. | |
| 2012/0030109 A1 | * | 2/2012 | Dooley Maley et al. | 705/44 |

OTHER PUBLICATIONS

U.S. Appl. No. 13/223,495, to inventors Jason Typrin, et al., "Access Control for a Financial Account", 28 page specification and 6 pages of drawings, filed Sep. 1, 2011.
"Revolutionary Savings & Investing for Bank of America", An MPOWER Ventures Company © 2009 Gratio Capital, Inc., 30 pages, 2009.
U.S. Patent and Trademark Office Official Action in U.S. Appl. No. 13/223,495, dated Sep. 1, 2011, 10 pages, Nov. 21, 2012.

* cited by examiner

*Primary Examiner* — James Vezeris
(74) *Attorney, Agent, or Firm* — Michael Springs (57) ABSTRACT

According to some embodiments, a system comprises an interface and one or more processors. The interface receives a request for a transaction from a primary user of a financial account. The processor(s) determine rules associated with the primary user. The rules indicate whether an administrator has authorized the primary user to make the transaction, and at least one of the rules includes comparing a location associated with the request to one or more approved locations from which the primary user is authorized to make the transaction. The processor(s) process the transaction according to the rules.

17 Claims, 6 Drawing Sheets

LOCATION-BASED RULES FOR A FINANCIAL ACCOUNT

TECHNICAL FIELD OF THE INVENTION

The present invention relates generally to financial accounts and more specifically to location-based rules for a financial account.

BACKGROUND OF THE INVENTION

Banks and other financial institutions provide financial accounts to customers. Examples of financial accounts include savings accounts, checking accounts, debit card accounts, credit card accounts, and investment accounts. Customers may access the financial accounts to deposit funds, withdraw funds, view account balances, and so on.

SUMMARY OF THE INVENTION

According to some embodiments, a system comprises an interface and one or more processors. The interface receives a request for a transaction from a primary user of a financial account. The processor(s) determine rules associated with the primary user. The rules indicate whether an administrator has authorized the primary user to make the transaction, and at least one of the rules includes comparing a location associated with the request to one or more approved locations from which the primary user is authorized to make the transaction. The processor(s) process the transaction according to the rules.

Certain embodiments of the invention may provide one or more technical advantages. A technical advantage of one embodiment includes determining whether to allow or decline a primary user's request for a financial transaction based on the location from which the transaction was requested. In certain embodiments, approved locations for the transaction may be configured by an administrator, such as a parent, and the primary user may be the administrator's child. Accordingly, the parent may restrict the child from conducting certain financial transactions outside of approved locations. In certain embodiments, the administrator may provide override authorization to allow a financial transaction to be conducted outside of the approved locations.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Embodiments of the present invention and its advantages are best understood by referring to FIGS. 1 through 4 of the drawings, like numerals being used for like and corresponding parts of the various drawings.

Banks and other financial institutions provide financial accounts to customers. Examples of financial accounts include savings accounts, checking accounts, debit card accounts, credit card accounts, and investment accounts. Customers may access the financial accounts to deposit funds, withdraw funds, view account balances, and so on. In certain situations, a customer may want to provide another person with access to the financial account. For example, a parent may want to provide a child with access to the financial account so that the child may pay for things like school and necessities. The parent may want to control the child's access to the account to help teach the child financial responsibility and to prevent the child from spending too much money on things like entertainment. FIGS. 1 through 4 below illustrate a system and method of controlling access for a financial account.

Figure 1:
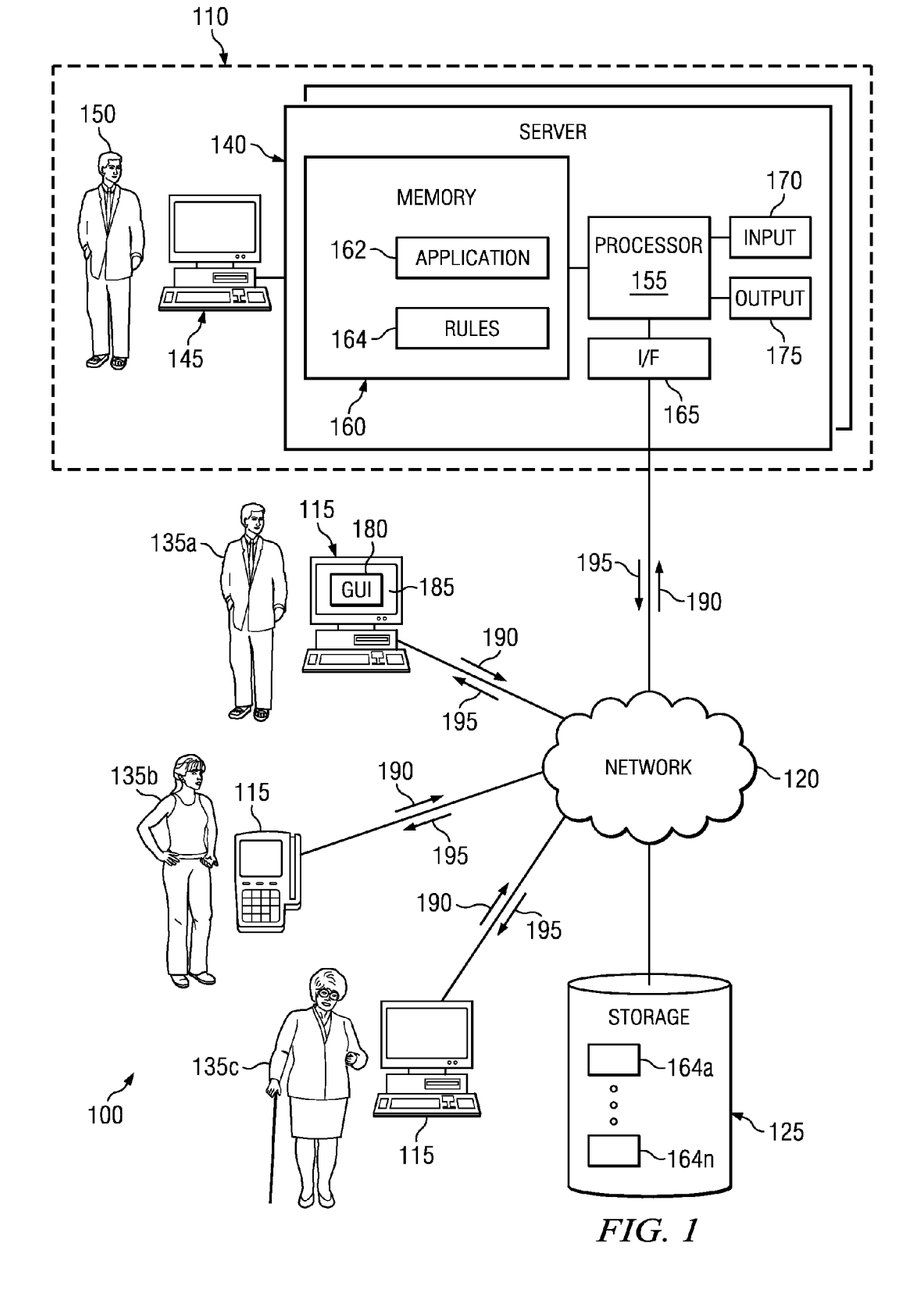
FIG. 1 illustrates an example of a system that applies rules in order to control a user's access to a financial account.

FIG. 1 illustrates a system 100 according to certain embodiments. System 100 may include enterprise 110, one or more clients 115, a network storage device 125, one or more servers 140, and one or more users 135. Enterprise 110, clients 115, and network storage device 125 may be communicatively coupled by a network 120.

System 100 may facilitate transactions for a controlled access financial account. Examples of transactions include deposit transactions, withdrawal transactions, and view transactions. Deposit transactions include transactions that increase the funds associated with the financial account. Withdrawal transactions include transactions that decrease the funds associated with the financial account, such as ATM withdrawals or credit card purchases. View transactions facilitate viewing account information, such as account balances, financial goals, or spending history.

Figure 2A:
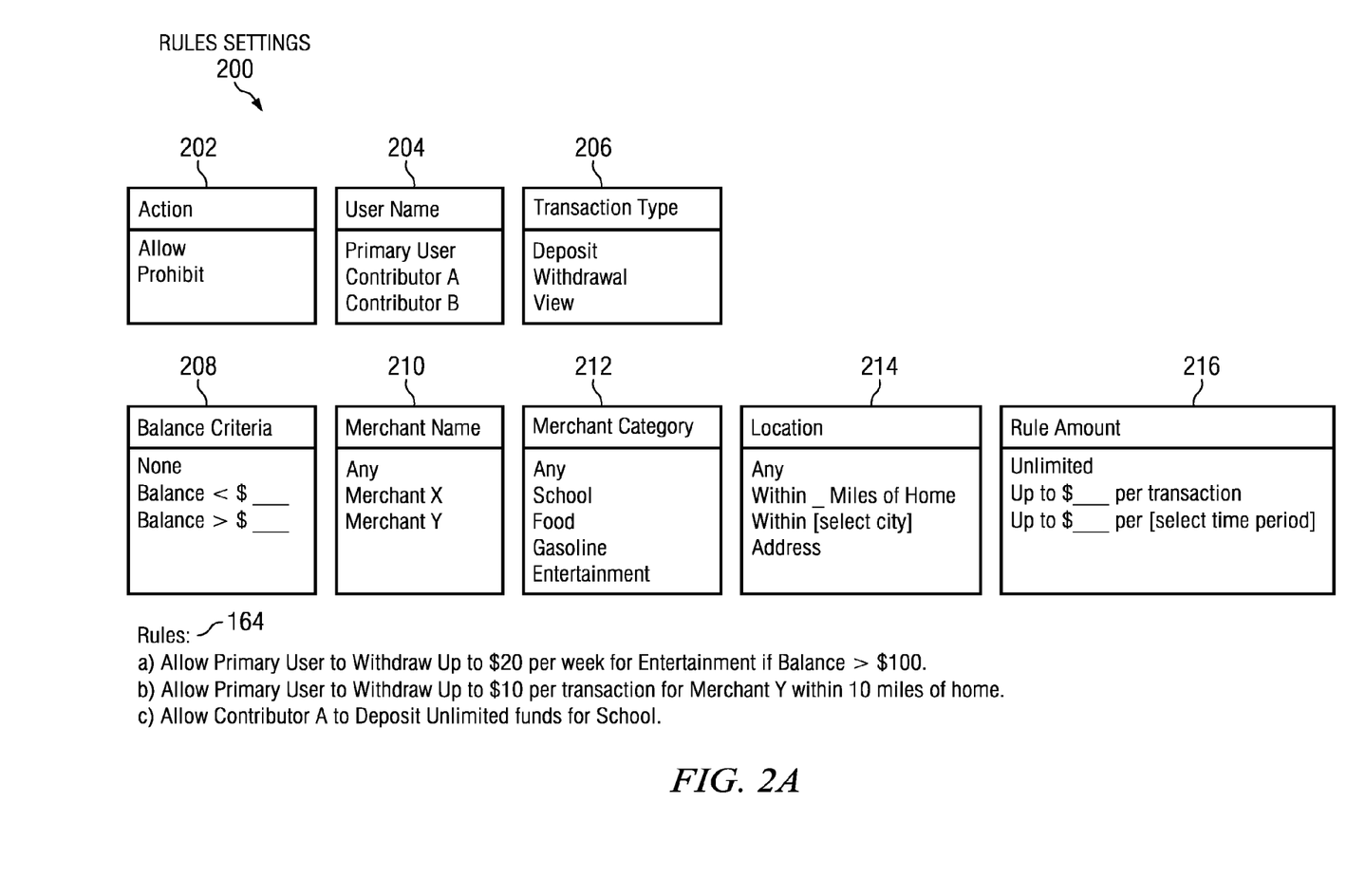
FIG. 2A illustrates an example of rule settings for configuring the rules that control the user's access to the financial account.

In certain embodiments, multiple users 135 have access to the same financial account. For example, an administrator 135a, a primary user 135b, and/or a contributor 135c may each have access to the financial account. System 100 is generally operable to control the level of access available to each user 135. In certain embodiments, system 100 applies rules 164 that grant certain users 135 authorization to make transactions that other users 135 are not authorized to make. As an example, administrator 135a may be a parent that configures rules 164 for the financial account and that is authorized to make any type of transaction (e.g., deposit, withdrawal, or view transaction). Primary user 135b may be a child that administrator 135a authorizes to make certain deposit, withdrawal, and/or view transactions according to rules 164. Contributor 135c may be a grandparent, aunt, uncle, friend, or other person that administrator 135a authorizes to make certain deposit and/or view transactions according to rules 164. FIG. 2A provides examples of rules 164 that may be configured by administrator 135a.

In general, user 135 utilizes client 115 to interact with server 140 to request transactions for the financial account. For example, user 135 provides a request 190 to server 140 utilizing client 115. In some embodiments, request 190 includes a user identifier associated with user 135, such as a login name for an online bank account, a credit card number, or any other information that may be associated with a particular user 135. Request 190 may also include information describing the requested transaction, such as the amount of money and/or the type of transaction (e.g., deposit, withdrawal, or view). Server 140 determines the user identifier in order to determine whether user 135 corresponds to administrator 135a, primary user 135b, or contributor 135c. Server 140 allows or declines the transaction according to rules 164 associated with the user identifier of user 135 requesting the transaction.

Client 115 may refer to any device that enables user 135 to interact with server 140. In some embodiments, client 115 may include a computer, workstation, telephone, Internet browser, electronic notebook, Personal Digital Assistant (PDA), pager, Automatic Teller Machine (ATM) or any other suitable device (wireless, wireline, or otherwise), component, or element capable of receiving, processing, storing, and/or communicating information with other components of system 100. Client 115 may also comprise any suitable user interface such as a display 185, microphone, keyboard, credit card reader, check reader, or any other appropriate terminal equipment usable by a user 135. It will be understood that system 100 may comprise any number and combination of clients 115.

In some embodiments, client 115 may include a graphical user interface (GUI) 180. GUI 180 is generally operable to tailor and filter data entered by and presented to user 135. GUI 180 may provide user 135 with an efficient and user-friendly presentation of request 190 and/or notification 195. GUI 180 may comprise a plurality of displays having interactive fields, pull-down lists, and buttons operated by user 135. GUI 180 may include multiple levels of abstraction including groupings and boundaries. It should be understood that the term GUI 180 may be used in the singular or in the plural to describe one or more GUIs 180 and each of the displays of a particular GUI 180.

In some embodiments, network storage device 125 may refer to any suitable device communicatively coupled to network 120 and capable of storing and facilitating retrieval of data and/or instructions. Examples of network storage device 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Network storage device 125 may store any data and/or instructions utilized by server 140. In the illustrated embodiment, network storage device 125b stores rules 164. FIG. 2A below illustrates an example of rules 164.

In certain embodiments, network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, enterprise 110 may refer to a financial institution such as a bank and may include one or more servers 140, an operator workstation 145, and an operator 150. In some embodiments, server 140 may refer to any suitable combination of hardware and/or software implemented in one or more modules to process data and provide the described functions and operations. In some embodiments, the functions and operations described herein may be performed by a pool of servers 140. In some embodiments, server 140 may include, for example, a mainframe, server, host computer, workstation, web server, file server, a personal computer such as a laptop, or any other suitable device operable to process data. In some embodiments, server 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, server 140 determines whether to allow or decline a transaction according to rules 164 associated with user 135 from whom request 190 was received. In some embodiments, servers 140 may include a processor 155, server memory 160, an interface 165, an input 170, and an output 175. Server memory 160 may refer to any suitable device capable of storing and facilitating retrieval of data and/or instructions. Examples of server memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates server memory 160 as internal to server 140, it should be understood that server memory 160 may be internal or external to server 140, depending on particular implementations. Also, server memory 160 may be separate from or integral to other memory devices to achieve any suitable arrangement of memory devices for use in system 100.

Server memory 160 is generally operable to store an application 162 and rules 164. Application 162 generally refers to logic, rules, algorithms, code, tables, and/or other suitable instructions for performing the described functions and operations. In some embodiments, application 162 facilitates determining whether to allow or decline the transaction according to rules 164 associated with user 135. In some embodiments, application 162 generates notification 195 to indicate whether the transaction was allowed or declined.

Server memory 160 communicatively couples to processor 155. Processor 155 is generally operable to execute application 162 stored in server memory 160 to apply rules 164 according to the disclosure. Processor 155 may comprise any suitable combination of hardware and software implemented in one or more modules to execute instructions and manipulate data to perform the described functions for servers 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for server 140, send output from server 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system, which allows server 140 to communicate to other devices. Communication interface 165 may include any suitable software operable to access data from various devices such as clients 115 and/or network storage device 125. Communication interface 165 may also include any suitable software operable to transmit data to various devices such as clients 115 and/or network storage device 125. Communication interface 165 may include one or more ports, conversion software, or both. In general, communication interface 165 receives request 190 from clients 115 and transmits notification 195 to clients 115.

In some embodiments, input device 170 may refer to any suitable device operable to input, select, and/or manipulate various data and information. Input device 170 may include, for example, a keyboard, mouse, graphics tablet, joystick, light pen, microphone, scanner, or other suitable input device. Output device 175 may refer to any suitable device operable for displaying information to a user. Output device 175 may include, for example, a video display, a printer, a plotter, or other suitable output device.

In general, operator 150 may interact with server 140 using an operator workstation 145. In some embodiments, operator workstation 145 may be communicatively coupled to server 140 and may refer to any suitable computing system, workstation, personal computer such as a laptop, or any other device operable to process data. In certain embodiments, an operator 150 may utilize operator workstation 145 to manage server 140 and any of the data stored in server memory 160 and/or network storage device 125.

In operation, application 162, upon execution by processor 155, facilitates applying rules 164 to request 190 in order to control user 135's access to the financial account. Application 162 may first receive request 190 from user 135 via client 115. In some embodiments, GUI 180 may provide locations for user 135 to enter request 190 and/or to select pre-filled options for request 190. Request 190 may include one or more user identifiers and/or information describing the requested transaction, such as the dollar amount of the transaction or whether the transaction corresponds to a deposit, withdrawal, or view transaction. Examples of user identifiers include identifiers of a computer account (e.g., online banking account), savings account, checking account, credit card account, or other account associated with user 135. Once application 162 receives request 190, application 162 determines whether user 135 corresponds to administrator 135a, primary user 135b, or contributor 135c based on the user identifier.

Application 162 may determine rules 164 associated with the particular user 135 and apply rules 164 to determine whether to allow or decline the transaction. As an example, in certain embodiments rule 164a may indicate an approved location from which primary user 135b may request transactions. If request 190 was initiated by primary user 135b, application 162 may determine the location from which request 190 was received. Application 162 then compares the location to the approved location indicated by rule 164. If the location associated with request 190 fails to correspond to the approved location, application 162 may decline the transaction. In some embodiments, application 162 generates notification 195 to communicate to one or more users 135 whether the transaction requested in request 190 was allowed or declined.

FIG. 2A illustrates an example of a rule settings 200 for configuring rules 164 that control user 135's access to the financial account. Rule settings 200 may allow administrator 135a to select an action 202, a user name 204, a transaction type 206, balance criteria 208, a merchant name 210, a merchant category 212, a location 214, a rule amount 216, a combination of the preceding, and/or any other suitable criteria to include in rules 164.

Action 202 may indicate whether to allow or prohibit the transaction defined by rule 164. Thus, by selecting the allow option, administrator 135a authorizes transactions described by rule 164. As an example, administrator 135a may configure rule 164 to allow primary user 135b to withdraw funds for school. By selecting the prohibit option, administrator 135a prohibits transactions described by rule 164. As an example, administrator 135a may configure rule 164 to prohibit the primary user from purchasing video games.

User name 204 may indicate the particular user 135 to whom rule 164 applies, such as primary user 135b or contributor 135c. In certain embodiments, administrator 135a may configure different rules 164 for different contributors. As an example, administrator 135a may configure a first rule 164 that allows primary user 164's grandparents to deposit contributions for any purpose. That is, the grandparents may specify a purpose when they make the contribution, or they may allow primary user 135b full discretion as to how to spend the contribution. Administrator 135a may configure a second rule 164 that allows primary user 135b's friends to deposit contributions specifically for primary user 135b to donate to charity.

Transaction type 206 may indicate whether rule 164 applies to deposit, withdrawal, or view transactions. In certain embodiments, administrator 135a may configure deposit, withdrawal, and/or view rules 164 associated with primary user 135b. In certain embodiments, administrator 135a may configure deposit and/or view rules 164 associated with contributor 135c. Thus, contributor 135c may be prevented from making withdrawals from the financial account.

Balance criteria 208 may indicate an account balance that causes rule 164 to become effective. In certain embodiments, administrator 135a may configure balance criteria 208 as "none" if rule 164 is to yield the same result regardless of the account balance. Alternatively, administrator 135a may configure balance criteria 208 greater than or less than a particular dollar amount. As an example, administrator 135a may allow primary user 135b to withdraw funds for entertainment if the account balance exceeds a minimum threshold. As another example, administrator 135a may prohibit contributor 135c from contributing funds if the account balance exceeds a maximum threshold.

Merchant name 210 may indicate particular merchants for which administrator 135a allows or prohibits transactions. As an example, administrator 135a may configure rule 164 to allow primary user 135b to make unlimited purchases (withdrawals) from Grocery Store X. As another example, administrator 135a may configure rule 164 to prohibit primary user 135b from making purchases over a certain dollar amount from Mall Y. Similarly, merchant category 212 may indicate categories of purchases that administrator 135a allows or prohibits. As an example, administrator 135a may configure rules 164 that prohibit primary user 135b from making purchases over a certain dollar amount for entertainment. As another example, administrator 135a may configure rules 164 that allow contributor 135c to deposit contributions for certain merchant categories 212, such as school. In certain embodiments, merchant categories 212 may be determined according to Standard Industrial Classification ("SIC") codes or other standard classification systems.

Location 214 may indicate locations for which administrator 135a allows or prohibits transactions. As an example, administrator 135a may allow transactions within approved locations. Approved locations may be determined based on a distance from home, school, or a selected address, or based on the boundaries of a city, county, neighborhood, or other area selected by administrator 135a.

Rule Amount 216 may indicate the amount of money that administrator 135a allows to be transacted. Administrator 135a may configure certain rules 164 with an unlimited amount of money. For example, administrator 135a may allow primary user 135b to spend unlimited funds on school. Administrator 135a may configure other rules 164 with limited amounts of money. Rule amount 216 may be configured according to any suitable time period or combination of time periods, such as per transaction, per day, per week, per month, per year, and so on. For example, administrator 135a may allow primary user 135b to withdraw up to $20 per transaction for entertainment as long as primary user 135b has spent less than $250 total on entertainment in the preceding 12 months.

Administrator 135a may add, delete, or modify rules 164 for any suitable reason. For example, if primary user 135b is travelling out of town for a class trip, administrator 135a may temporarily update location 214 to allow out of town purchases.

In certain embodiments, administrator 135a configures access conditions that, when satisfied, grant primary user 135b increased access to the financial account. As an example, selected rules 164 that restrict transactions to particular locations, merchant categories, maximum purchase amounts, etc. may be automatically deleted (or modified to be less restrictive) in response to satisfying the access condition. As another example, primary user 135b may be granted access to dormant features of the financial account in response to satisfying the access condition. In certain embodiments, the financial account may optionally include multiple sub-accounts, such as savings accounts, checking accounts, credit card accounts, investment accounts, and so on. Administrator 135a may configure an access condition that allows primary user 135b access to the credit card account upon reaching a certain age, such as age 16. Examples of other access conditions include, but are not limited to, maintaining a certain grade point average, maintaining a minimum account balance, and completing a financial responsibility course.

Administrator 135a may configure different rules 164 for different sub-accounts. For example, primary user 135b may use a checking account to deposit money that primary user 135b earns baby-sitting, and administrator 135a may configure rules 164 to allow primary user 135b to make unlimited withdrawals from the checking account. By contrast, administrator 135a may configure rules that prohibit primary user 135 from making withdrawals from a college savings account for any category other than tuition.

Figure 2B:
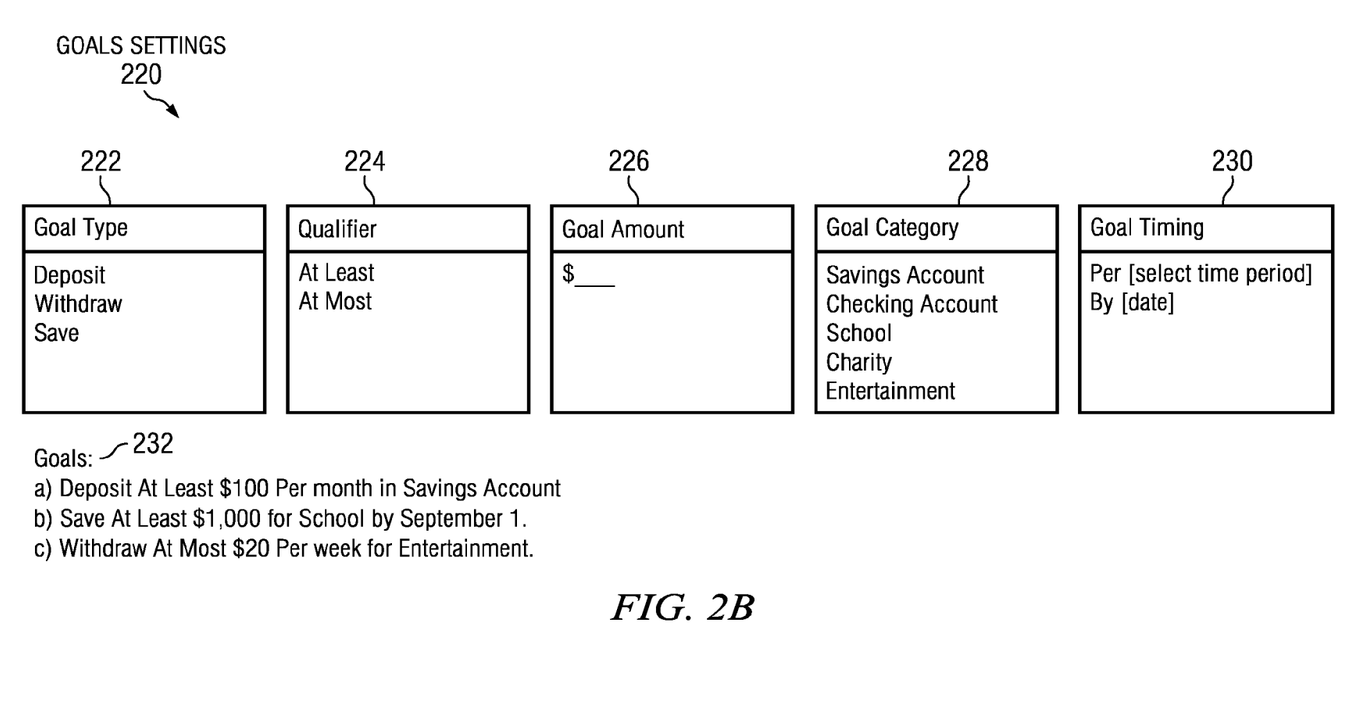
FIG. 2B illustrates an example of goal settings for the financial account.

In certain embodiments, administrator 135a and/or primary user 135b may configure financial goals 232 for the financial account. FIG. 2B illustrates an example of goal settings 220, such as a goal type 222, a qualifier 224, a goal amount 226, a goal category 228, goal timing 230, any other suitable criteria, or a combination of the preceding.

Goal type 222 indicates the type of goal. Goals 232 may have any suitable type, such as deposit, withdraw, or save. Qualifier 224 indicates whether the goal is a minimum amount (e.g., the "at least" setting) or a maximum amount (e.g., the "at most" setting). For example, administrator 135a and/or primary user 135b may configure deposits and savings goals 232 to reach at least a minimum amount, while withdrawal goals 232 may be configured not to exceed a maximum amount. Goal amount 226 indicates the dollar amount of goal 232. Goal category 228 indicates the category to which the goal applies, such as a particular account (savings, checking, etc.), or category of spending (e.g., school, charity, entertainment, etc.). Goal timing 230 indicates a targeted time frame for reaching goal 232. Goal timing 230 may be per time period, such as a day, week, month, year, and so on, or per date. As an example, primary user 135b may set a goal 232 to save at least the cost of text books by the first day of the school year. In certain embodiments, administrator 135a may configure rules 164 to allow contributor 135c to view goals 232 and to deposit contributions toward certain goals 232 of contributor 135c's choosing. In certain embodiments, primary user 135b may configure a notification to communicate goals 232 and/or requests for funds to administrator 135a and/or contributor 135c.

Figure 2C:
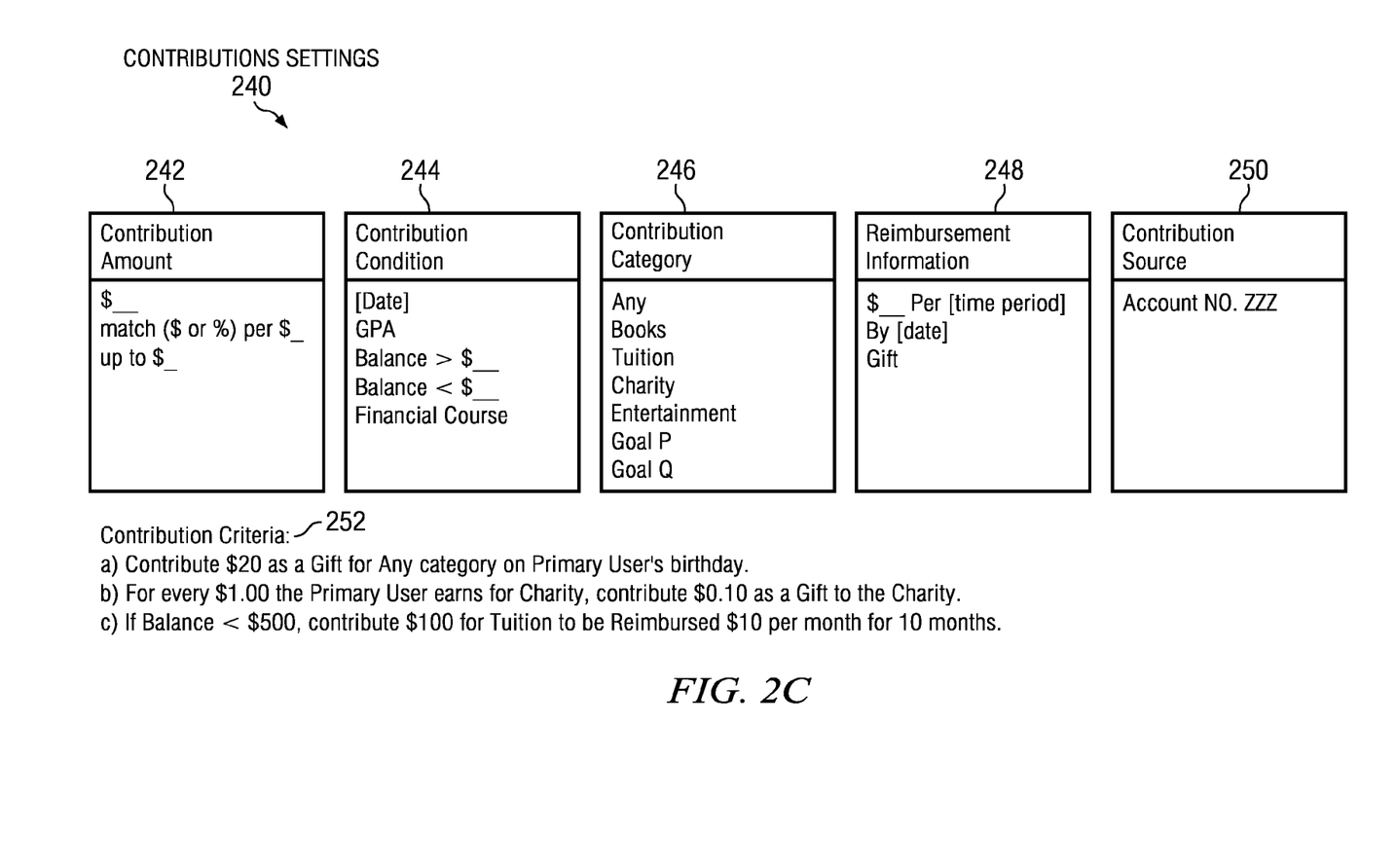
FIG. 2C illustrates an example of contribution settings for the financial account.

FIG. 2C illustrates an example of a contribution settings 240 operable to prompt administrator 135a and/or contributor 135c to configure contribution criteria 252 for the financial account. For example, contribution settings 240 may allow administrator 135a and/or contributor 135c to select a contribution amount 242, a contribution condition 244, a contribution category 246, reimbursement settings 248, contribution source 250, other suitable criteria, or a combination of the preceding to include in contribution criteria 252.

Contribution amount 242 may indicate the dollar amount to be contributed (deposited) to the financial account. In certain embodiments, contribution amount 242 may comprise a fixed dollar amount. Alternatively, contribution amount 242 may comprise a variable amount, such as a matching contribution. As an example, for every dollar primary user 135b earns at a part-time job, contributor 135c may match $0.10. Contributor 135c may define a threshold beyond which the matching contribution automatically stops.

Contribution condition 244 indicates conditions that may be configured to automatically deposit the contribution. As an example, contribution condition 244 may be configured to deposit the contribution on primary user 135b's birthday. As another example, contribution condition 244 may be configured to deposit the contribution when the account balance exceeds a minimum threshold (to reward primary user 135b for financial responsibility) or falls below a maximum threshold (to help primary user 135b when funds are low). Other examples of contribution conditions 244 include maintaining a certain grade point average or completing a financial responsibility course. Alternatively, administrator 135a and/or contributor 135c may opt to make an unconditional contribution.

Contribution category 246 indicates a spending category for the contribution. Contributor 135c may select "any" to allow primary user 135b full discretion as to how to spend the contribution. Contributor 135c may select a particular category, such as books, tuition, or charity, to restrict how primary user 135b spends the contribution to the selected contribution category 246. As another example, contributor 135c may select to contribute to a particular goal 232 that administrator 135a and/or primary user 135b configured for the financial account.

Reimbursement settings 248 indicate whether the contribution is intended as a loan to be reimbursed or a gift. If the contribution is a loan, contributor 135c may configure how the loan is to be reimbursed. For example, contributor 135c may specify a periodic minimum payment amount and/or a deadline for repaying the entire loan.

Contribution source 250 may indicate the account from which to make the contribution and/or receive reimbursements. As an example, administrator 135a may configure a relationship between the controlled access financial account and an account associated with administrator 135a, such as a checking account. Administrator 135a may make contributions from the checking account to the controlled access financial account and/or receive reimbursements from the controlled access financial account to the checking account. Similarly, contributor 135c may establish a relationship between the controlled access financial account and an account associated with contributor 135c in order to deposit contributions and/or receive reimbursements.

Figure 3:
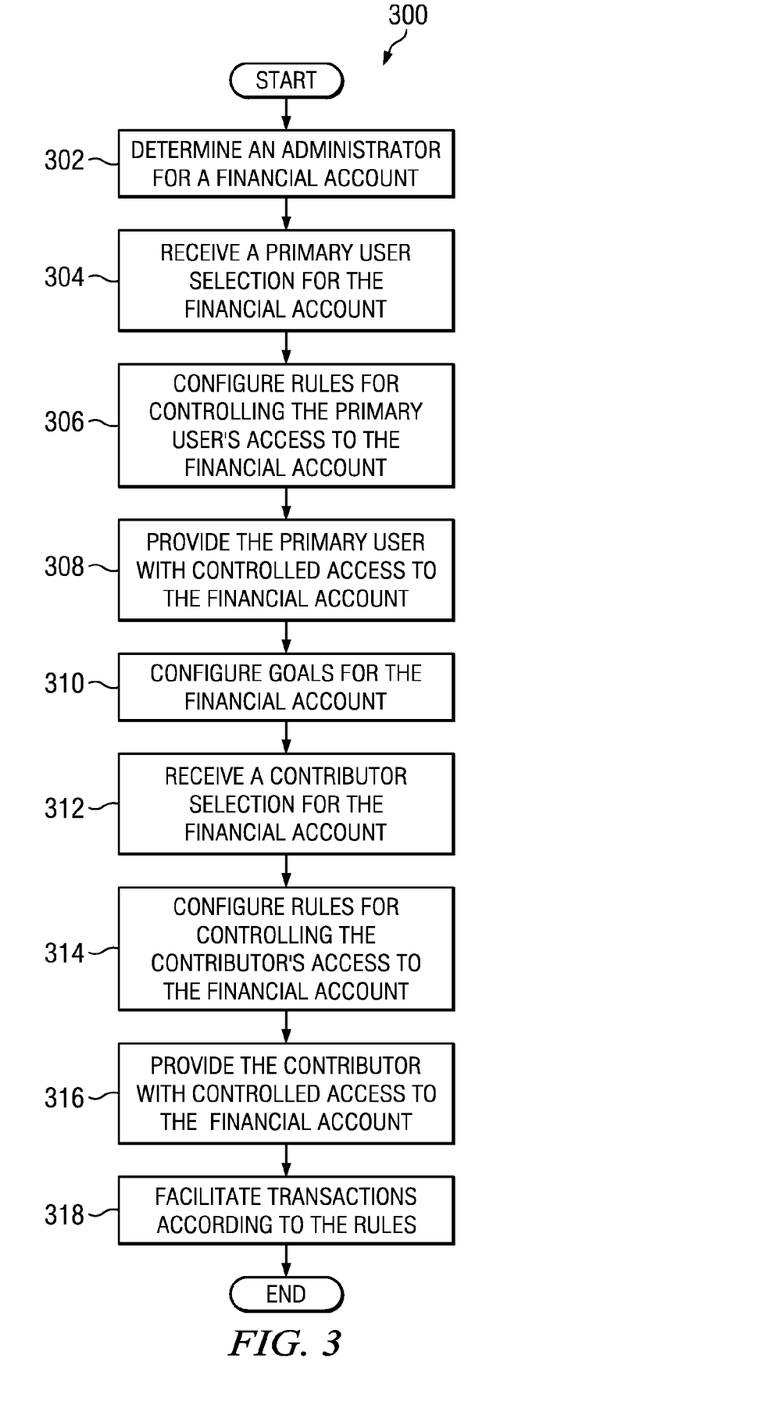
FIG. 3 illustrates an example of a method for controlling the user's access to the financial account.

FIG. 3 illustrates an example of a method 300 for controlling user 135's access to the financial account. The method begins at step 302 by establishing administrator 135a for the financial account. In certain embodiments, a person, such as parent, may be established as an administrator 135a by opening a controlled access financial account with enterprise 110. At step 304, administrator 135a selects primary user 135b, such as administrator 135a's teen-aged child, and server 140 receives the selection. Selecting primary user 135b may include communicating one or more user identifiers to server 140. Examples of user identifiers include a login name for an online bank account, a credit card number, or any other information that may be uniquely associated with primary user 135b.

Administrator 135a configures rules 164 for controlling primary user 135b's access to the financial account in step 306. In certain embodiments, administrator 135a interacts with client 115 to send server 140 a request to configure rules 164. The request may include one or more fields described with respect to FIG. 2A. Administrator 135a may fill in user name 204 with primary user 135b's name to indicate the subset of rules 164 that apply to primary user 135b. Administrator 135a may fill in some or all of the other fields based on how administrator 135a wants to control primary user 135b's access to the financial account. In certain embodiments, administrator 135a authorizes primary user 135b to make deposit, withdrawal, and/or view transactions.

At step 308, primary user 135b receives access to the financial account. In certain embodiments, administrator 135a may provide primary user 135b with a credit card or a checkbook in order for primary user 135b to access the financial account. In certain embodiments, administrator 135a may prompt server 140 to invite primary user 135b to create an online banking account associated with the financial account. Primary user 135b's access to the financial account may be controlled by applying rules 164 if primary user 135b requests a transaction, such as a purchase using the credit card, check, or online banking account.

Goals 232 may be configured at step 310. In certain embodiments, administrator 135a and/or primary user 135b interact with client 115 to send server 140 a request to configure goals 232. Goals 232 may include goal type 222, qualifier 224, goal amount 226, goal category 228, goal timing 230, or any other suitable information as described in FIG. 2B.

At step 312, administrator 135a selects contributor 135c, such as primary user 135b's grandparent or friend, and server 140 receives the selection. Selecting contributor 135c may include communicating one or more user identifiers to server 140. Examples of user identifiers include a login name for an online bank account, a credit card number, or any other information that may be uniquely associated with contributor 135c.

Administrator 135a configures rules 164 for controlling contributor 135c's access to the financial account in step 314. In certain embodiments, administrator 135a interacts with client 115 to send server 140 a request to configure rules 164. The request may include one or more fields described with respect to FIG. 2A. Administrator 135a may fill in user name 204 with contributor 135c's name to indicate the subset of rules 164 that apply to contributor 135c. Administrator 135a may fill in some or all of the other fields based on how administrator 135a wants to control contributor 135c's access to the financial account. In certain embodiments, administrator 135a authorizes contributor 135c to make deposit and/or view transactions. Examples of view transactions may include viewing account balances, spending history, and/or goals 232.

At step 316, contributor 135c receives controlled access (e.g., access according to rules 164) to the financial account. In certain embodiments, administrator 135a may prompt server 140 to invite contributor 135c to make online contributions to the financial account, for example, by providing a login name and password to contributor 135c.

The method proceeds to step 318 to facilitate transactions initiated by administrator 135a, primary user 135b, and/or contributor 135c. For example, primary user 135b may send request 190 to make a deposit, withdrawal, or view transaction, and server 140 may allow or decline the transaction according to rules 164 associated with primary user 135b. Similarly, contributor 135c may send request 190 to make a deposit or view transaction, and server 140 may allow or decline the transaction according to rules 164 associated with contributor 135c. In certain embodiments, contributor 135c's request 190 for a deposit may include one or more fields described in FIG. 2C. The method then ends.

Figure 4:
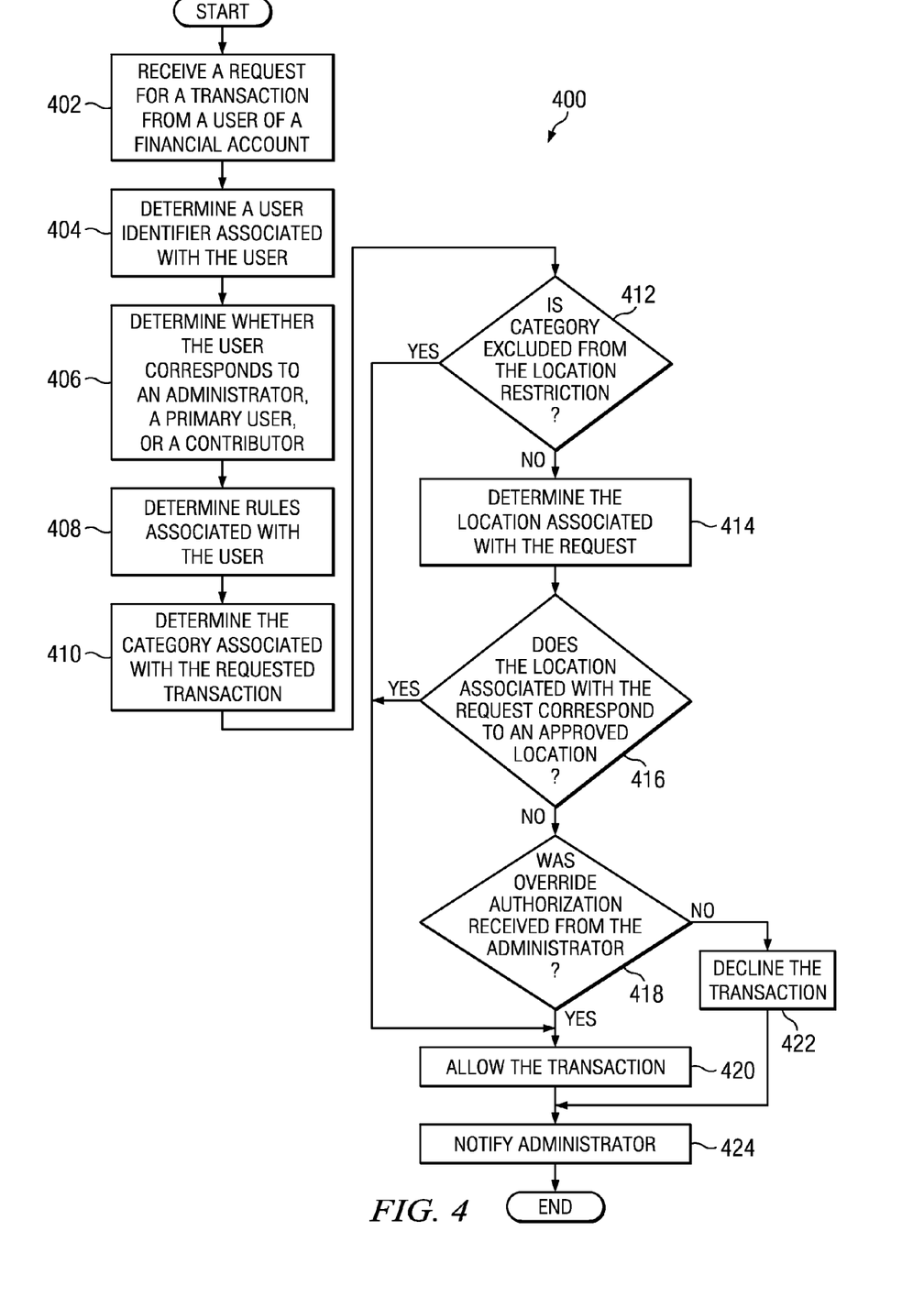
FIG. 4 illustrates an example of a method for conducting a transaction according to the rules.

FIG. 4 illustrates an example of a method 400 for conducting a transaction according to rules 164. The method begins at step 402 where application 162 receives request 190 requesting a transaction for a financial account. In certain embodiments, user 135 interacts with client 115 to initiate communicating request 190 to server 140. As an example, client 115 may comprise a credit card machine, and primary user 135b may swipe a credit card through the credit card machine to initiate request 190 requesting to withdraw funds from the financial account in order to make a purchase. As another example, client 115 may comprise a computer or PDA that contributor 135c uses to access an online banking website to initiate request 190 requesting to deposit a contribution into the financial account.

At step 404, application 162 determines a user identifier associated with user 135. In certain embodiments, application 162 determines the user identifier according to information provided in request 190, such as a credit card number or information identifying an online bank account from which request 190 was received (e.g., login name or online bank account number). At step 406, application 162 determines, based on the user identifier, whether request 190 was received from administrator 135a, primary user 135b, or contributor 135c. For purposes of illustration, the following steps describe an example in which application 162 determines that user 135 corresponds to primary user 135b.

Application 162 determines one or more rules 164 associated with primary user 135b at step 408. In certain embodiments, application 162 retrieves rules 164 associated with the financial account from network storage device 125. Application 162 may associate rules 164 with primary user 135b if user name 204 corresponds to primary user 135b. Rules 164 may include any suitable fields as described with respect to FIG. 2A. As an example, rule 164a may allow primary user 135b to make withdrawal transactions only from locations 214 that have been approved by administrator 135a, such as within 20 miles of primary user 135b's home. Rule 164a may exclude certain transactions from the location restriction. For example, rule 164a may allow primary user 135 to make withdrawal transactions in certain merchant categories 212, such as grocery, gasoline, tuition, charity, and medical categories, even if primary user 135 is more than 20 miles away from home. For purposes of illustration, the following steps describe an example in which application 162 applies rule 164a, however, any suitable rule may be applied.

At step 410, application 162 determines merchant category 214 associated with the requested transaction. In certain embodiments, merchant category 214 may be provided to application 162 in request 190. At step 412, application 162 determines if merchant category 214 associated with the requested transaction is excluded from the location restriction of rule 164a. In the example, if merchant category 214 corresponds to the grocery, gasoline, tuition, charity, or medical categories, application 162 determines that the requested transaction is excluded from the location restriction and proceeds to step 420 to allow the transaction. If merchant category 214 corresponds to any other category, the method proceeds to step 414.

Application 162 associates request 190 with the location from which request 190 was received at step 414. In certain embodiments, the location may be determined based on geographic information, such as global positioning system (GPS) coordinates or a street address. In certain embodiments, the location may be determined from merchant information, such as a store number or merchant name that application 162 associates with a location. In certain embodiments, the geographic information and/or the merchant information may be provided in request 190 that client 115 communicates to server 140.

Application 162 determines whether the location associated with request 190 corresponds to location 214 of rule 164a. In the example, if the location associated with request 190 corresponds to a location within 20 miles of primary user 135b's home, the method proceeds to step 420 to allow the transaction. If the location associated with request 190 is more than 20 miles from primary user 135b's home, the method proceeds to step 418.

At step 418, application 162 determines whether administrator 135a provided override authorization for the requested transaction. If administrator 135a provided override authorization, application 162 allows the transaction that failed rule 164a. Override authorization may be obtained in any suitable manner. For example, during a shopping trip, primary user 135b may find an item to purchase that primary user 135b determines would fail rule 164a. Prior to going to the checkout, primary user 135b may send an override request to administrator 135a, for example, using primary user 135b's wireless phone to send an email, a text message, or other suitable override request to administrator 135a. The override request may include information about the requested purchase, such as the merchant name, merchant category, store location, dollar amount, and so on. Primary user 135b may manually enter certain information in the override request. Alternatively, primary user 135b may use the wireless phone to automatically include the information. For example, the wireless phone may provide GPS coordinates to indicate primary user 135b's current location. As another example, the wireless phone may be used to scan the item's barcode in order to provide the merchant category or dollar amount of the proposed purchase.

If administrator 135a agrees to allow the purchase, administrator 135a may communicate override authorization to server 140 via client 115. Server 140 may then communicate a notification to primary user 135b indicating whether administrator 135a granted or denied override authorization. In certain embodiments, the notification may include an authorization code for the purchase if override authorization was granted. Primary user 135b may then proceed to the checkout to initiate request 190, for example, by swiping a credit card through a credit card machine. In certain embodiments, request 190 may include a description of the transaction (e.g., merchant name, merchant category, store location, dollar amount and/or the authorization code). Application 162 may analyze the information included in request 190 to determine if the transaction corresponds to the proposed transaction (i.e., the transaction to which administrator 135a granted override authorization). Upon confirming override authorization, the method proceeds to step 420 to allow the transaction. However, if override authorization was not received, the method proceeds to step 422 to decline the transaction.

At step 424, application 162 communicates notification 195 to administrator 135a describing request 190. For example, notification 195 may include the dollar amount, geographic location, merchant name, merchant category, date, time, or other information describing the transaction. Notification 195 may indicate whether the transaction was allowed or declined. In certain embodiments, notification 195 may be sent to administrator 135a in real time (e.g., via email or text message). Alternatively, notification 195 may be stored in a database associated with enterprise 110 and retrieved by administrator 135a at a later time. Accordingly, administrator 135a may review primary user 135b's transaction history and update rules 164 to add or remove restrictions based on administrator 135a's assessment of primary user 135b's spending habits. In certain embodiments, administrator 135a may configure notification 195 to alert administrator 135a only if certain conditions are met, such as if the transaction requested in request 190 exceeds a maximum dollar amount, or if request 190 was sent from a location outside of an approved location, such as more than 20 miles away from primary user 135b's home. The method then ends.

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set. A subset may include zero, one, or more members. A subset of rules 164 may include some, none, or all of the rules 164 associated with the financial account.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described in detail, it should be understood that various changes, substitutions, and alterations can be made hereto without departing from the scope of the invention as defined by the appended claims.

What is claimed is:

1. A system, comprising:
an interface operable to:
receive a request for a transaction from a primary user of a financial account;
one or more processors operable to:
determine rules associated with the primary user, the rules indicating whether an administrator has authorized the primary user to make the transaction; and
process the transaction according to the rules, wherein at least one of the rules includes comparing a location associated with the request to one or more approved locations from which the primary user is authorized to make the transaction, each of the approved locations within a pre-determined distance of an address associated with the primary user;
receive an override request from the primary user prior to receiving the request for the transaction, the override request seeking authorization for a proposed transaction that would fail according to one or more of the rules;
communicate the override request to the administrator;
receive override authorization from the administrator; and
communicate an authorization code to the primary user in response to receiving the override authorization;
wherein the request for the transaction comprises the authorization code and a description of the transaction; and
the one or more processors further operable to allow the transaction using the authorization code to confirm that the description of the transaction matches the proposed transaction for which the administrator provided override authorization.

2. The system of claim 1, the one or more processors further operable to decline the transaction if the location associated with the request fails to correspond to one of the approved locations.

3. The system of claim 1, the one or more processors further operable to determine the location associated with the request based on geographic information.

4. The system of claim 1, the one or more processors further operable to determine the location associated with the request based on merchant information.

5. The system of claim 1, the one or more processors further operable to exclude selected transactions from the rule that compares the location associated with the request to the one or more approved locations.

6. The system of claim 1, the one or more processors further operable to:
communicate a notification to the administrator describing the request for the transaction and the location associated with the request.

7. A non-transitory computer readable storage medium comprising logic, the logic, when executed by a processor, operable to:
receive a request for a transaction from a primary user of a financial account;
determine rules associated with the primary user, the rules indicating whether an administrator has authorized the primary user to make the transaction;
process the transaction according to the rules, wherein at least one of the rules includes comparing a location associated with the request to one or more approved locations from which the primary user is authorized to make the transaction, each of the approved locations within a pre-determined distance of an address associated with the primary user;
receive an override request from the primary user prior to receiving the request for the transaction, the override request seeking authorization for a proposed transaction that would fail according to one or more of the rules;
communicate the override request to the administrator;
receive override authorization from the administrator; and
communicate an authorization code to the primary user in response to receiving the override authorization;
wherein the request for the transaction comprises the authorization code and a description of the transaction; and
the logic further operable to allow the transaction using the authorization code to confirm that the description of the transaction matches the proposed transaction for which the administrator provided override authorization.

8. The medium of claim 7, the logic further operable to decline the transaction if the location associated with the request fails to correspond to one of the approved locations.

9. The medium of claim 7, the logic further operable to determine the location associated with the request based on geographic information.

10. The medium of claim 7, the logic further operable to determine the location associated with the request based on merchant information.

11. The medium of claim 7, the logic further operable to exclude selected transactions from the rule that compares the location associated with the request to the one or more approved locations.

12. The medium of claim 7, the logic further operable to:
communicate a notification to the administrator describing the request for the transaction and the location associated with the request.

13. A method, comprising:
receiving a request for a transaction from a primary user of a financial account;
determining, by one or more processors, rules associated with the primary user, the rules indicating whether an administrator has authorized the primary user to make the transaction;
processing the transaction according to the rules, wherein at least one of the rules includes comparing a location associated with the request to one or more approved locations from which the primary user is authorized to make the transaction, each of the approved locations within a pre-determined distance of an address associated with the primary user;
receiving an override request from the primary user prior to receiving the request for the transaction, the override request seeking authorization for a proposed transaction that would fail according to one or more of the rules;
communicating the override request to the administrator;
receiving override authorization from the administrator; and
communicating an authorization code to the primary user in response to receiving the override authorization;
wherein the request for the transaction comprises the authorization code and a description of the transaction; and
the method further comprising allowing the transaction using the authorization code to confirm that the description of the transaction matches the proposed transaction for which the administrator provided override authorization.

14. The method of claim 13, further comprising declining the transaction if the location associated with the request fails to correspond to one of the approved locations.

15. The method of claim 13, further comprising determining the location associated with the request based on geographic information.

16. The method of claim 13, further comprising determining the location associated with the request based on merchant information.

17. The method of claim 13, further comprising:
communicating a notification to the administrator describing the request for the transaction and the location associated with the request.

* * * * *